US012590618B2

(12) United States Patent
Kimura

(10) Patent No.: US 12,590,618 B2
(45) Date of Patent: Mar. 31, 2026

(54) SHOCK ABSORBER AND METHOD OF MANUFACTURING THE SHOCK ABSORBER

(71) Applicant: Hitachi Astemo, Ltd., Hitachinaka (JP)

(72) Inventor: Tsubasa Kimura, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 339 days.

(21) Appl. No.: 18/182,105

(22) Filed: Mar. 10, 2023

(65) Prior Publication Data

US 2023/0213083 A1      Jul. 6, 2023

Related U.S. Application Data

(63) Continuation of application No. PCT/JP2020/039017, filed on Oct. 16, 2020.

(51) Int. Cl.
*F16F 13/00* (2006.01)
*B29C 45/26* (2006.01)
(Continued)

(52) U.S. Cl.
CPC ............ *F16F 13/02* (2013.01); *B29C 45/261* (2013.01); *B29C 45/64* (2013.01); *B29L 2031/721* (2013.01); *F16F 2230/0029* (2013.01)

(58) Field of Classification Search
CPC ........................... F16F 9/3257; B29C 45/5675
See application file for complete search history.

(56) References Cited

U.S. PATENT DOCUMENTS

2006/0131788 A1* 6/2006 Takigawa .............. B29C 45/561
                                                                264/318
2013/0285300 A1* 10/2013 Shimasaki ............. B60G 15/06
                                                                267/221
(Continued)

FOREIGN PATENT DOCUMENTS

AT          523211 A2     6/2021
DE    102019114987 A1     2/2020
(Continued)

OTHER PUBLICATIONS

International Search Report mailed Nov. 10, 2020 for the corresponding International Patent Application No. PCT/JP2020/039017 (5 pages including English translation).
(Continued)

*Primary Examiner* — Nicholas J Lane
(74) *Attorney, Agent, or Firm* — Leason Ellis LLP; Edward J. Ellis; Melvin C. Garner

(57) ABSTRACT

A shock absorber, including: a first cylindrical body; a second cylindrical body surrounding an outer peripheral surface of the first cylindrical body and provided movably in a direction of an axis of the first cylindrical body with respect to the first cylindrical body; a spring provided between the outer peripheral surface of the first cylindrical body and an inner peripheral surface of the second cylindrical body and applying a force in a direction of separating the first cylindrical body and the second cylindrical body; and a spring seat portion that is a cylindrical body provided between the outer peripheral surface of the first cylindrical body and the inner peripheral surface of the second cylindrical body and supporting an end portion of the spring in the axis direction, the spring seat portion being made of resin and being arranged movably in a direction intersecting the axis direction.

9 Claims, 15 Drawing Sheets

(51) Int. Cl.
    *B29C 45/64*       (2006.01)
    *F16F 13/02*       (2006.01)
    *B29L 31/00*       (2006.01)

(56)               References Cited

U.S. PATENT DOCUMENTS

| | | | |
|---|---|---|---|
| 2014/0252706 A1* | 9/2014 | Kamioka | B60G 15/061 |
| | | | 267/217 |
| 2020/0039132 A1 | 2/2020 | Baba | |
| 2020/0340547 A1* | 10/2020 | Nakano | F16F 13/007 |
| 2022/0001446 A1 | 1/2022 | Maruyama et al. | |
| 2022/0097794 A1* | 3/2022 | Ikeda | B62K 25/08 |

FOREIGN PATENT DOCUMENTS

| | | |
|---|---|---|
| DE | 112020000985 T5 | 11/2021 |
| GB | 2335477 A | 9/1999 |
| JP | 2008101735 A | 5/2008 |
| JP | 2010084922 A | 4/2010 |
| JP | 2010261477 A | 11/2010 |
| JP | 2014240664 A | 12/2014 |

OTHER PUBLICATIONS

Indian Office Action mailed Oct. 9, 2025 for the corresponding Indian Patent Application No. 202347016549; Total 1 7 pages.
Office Action of the corresponding German Patent Application No. DE 112020007415.3 dated May 5, 2025 with English Translation, 8 pages.

\* cited by examiner

FIG. 2

SHOCK ABSORBER AND METHOD OF MANUFACTURING THE SHOCK ABSORBER

CROSS-REFERENCE TO RELATED APPLICATIONS

This is a Continuation of International Patent Application No. PCT/JP2020/039017 filed on Oct. 16, 2020, the entire content of which is incorporated herein by reference.

FIELD OF THE INVENTION

The present invention relates to a shock absorber provided in a saddle type vehicle to attenuate a vibration energy, and a method of manufacturing the shock absorber.

BACKGROUND OF THE INVENTION

A front fork is an example of a shock absorber installed in a saddle type vehicle such as a motorcycle or a tricycle. A part of energy such as vibration received from a road surface during traveling of the saddle type vehicle is attenuated by the front fork that supports a front wheel. As a technology of the related art that is related to a front fork, there is a technology disclosed in Patent Literature 1, for example.

A shock absorber as illustrated in JP2014-240664A is provided with a coil spring inside. A lower end of the coil spring is supported by a spring holder on a lower side. An upper end of the coil spring is supported by a spring holder having a cylindrical shape and located on an upper side that is fitted on an outer peripheral surface of a cylinder. The spring holder is provided between an outer peripheral surface of the cylinder and an inner peripheral surface of an inner tube.

Generally, while a saddle type vehicle is traveling, a front fork receives a bending load (a force in a direction intersecting an axial direction of the front fork) via a front wheel. When the front fork receives a large bending load, the bending load also acts on a spring holder on an upper side. Most of the spring holders on the upper side so far are made of a metal material such as an aluminum alloy in order to meet a condition such as strength required for the spring holder. There is room for improvement in the spring holder in order to reduce weight and cost of a front fork.

An object of the present invention is to provide a shock absorber or the like that can reduce weight and cost.

As a result of extensive studies, the inventors of the present invention have found that a bending load can be relieved by arranging a spring seat portion corresponding to the above-described "spring holder on the upper side" provided between a first cylindrical body and a second cylindrical body in a form that allows movement of the spring seat portion in a direction (radial direction) intersecting an axial direction of the first cylindrical body without being in close contact with an outer peripheral surface of the first cylindrical body. By arranging the spring seat portion as described above, it is possible to reduce a strength condition required for the spring seat portion so far, so the inventors of the present invention have found that it is possible to make the spring seat portion made of resin, and it is possible to reduce weight and cost of a shock absorber.

Also, for a purpose of circulating internal fluid smoothly when the shock absorber expands and contracts, the spring seat portion may have a hole for circulating the fluid. When this hole is provided, it is provided in a direction that intersects an axial direction of the spring seat portion. In a spring seat portion made of a metal material of the related art, it is difficult to reduce a thickness in a radial direction in order to obtain a form having a predetermined strength. Therefore, when the fluid passes through the hole, the fluid collides with a metal material (side surface of the hole where both ends in a radial direction of the spring seat portion are open) defining the hole, generating a large flow resistance. On the other hand, the inventors of the present invention have also found that by making the spring seat portion made of resin, it becomes easier to change a thickness and shape of a resin defining the hole to the desired thickness and shape, which makes it easier to reduce flow resistance, and as a result, it becomes easier to improve performance of an absorber.

Furthermore, when manufacturing the metal spring seat portion of the related art, it was necessary to use a mold for forming the hole. On the other hand, the inventors of the present invention have also found that by making the spring seat portion of resin, the hole can be formed without using the mold, thereby making it easier to reduce the cost of the shock absorber.

The present invention was completed based on these findings.

SUMMARY OF THE INVENTION

The present disclosure will be described below.

According to an aspect of the present disclosure, there is provided a shock absorber including a first cylindrical body formed in a cylindrical shape, a second cylindrical body surrounding an outer peripheral surface of the first cylindrical body and provided movably in a direction of an axis of the first cylindrical body with respect to the first cylindrical body, a spring provided between the outer peripheral surface of the first cylindrical body and an inner peripheral surface of the second cylindrical body and applying a force in a direction of separating the first cylindrical body and the second cylindrical body, and a spring seat portion that is a cylindrical body provided between the outer peripheral surface of the first cylindrical body and the inner peripheral surface of the second cylindrical body and supporting an end portion of the spring in the axis direction, the spring seat portion being made of resin and being arranged movably in a direction intersecting the axis direction.

According to another aspect of the present disclosure, there is provided a shock absorber including a first cylindrical body formed in a cylindrical shape, a second cylindrical body surrounding an outer peripheral surface of the first cylindrical body and provided movably in a direction of an axis of the first cylindrical body with respect to the first cylindrical body, a spring provided between the outer peripheral surface of the first cylindrical body and an inner peripheral surface of the second cylindrical body and applying a force in a direction of separating the first cylindrical body and the second cylindrical body, and a spring seat portion that is a cylindrical body provided between the outer peripheral surface of the first cylindrical body and the inner peripheral surface of the second cylindrical body and supporting an end portion of the spring in the axis direction, the spring seat portion being made of resin and being arranged movably in a direction intersecting the axis direction. The spring seat portion includes a first cylindrical portion having a cylindrical shape and supporting the end portion of the spring, a second cylindrical portion having a cylindrical shape and continuously extending from the first cylindrical portion toward a side opposite to the spring, a groove located on an outer peripheral surface of the spring seat portion and extending from a tip end surface of the second cylindrical portion toward a tip end surface of the first cylindrical portion, and a through hole positioned at a bottom of the groove and bored in a direction intersecting an axis of the spring seat portion. An outer diameter of the second cylindrical portion is smaller than an outer diameter of the first cylindrical portion, an inner diameter of the second cylindrical portion is smaller than an inner diameter of the first cylindrical portion, and an inner peripheral surface of the second cylindrical portion has a curved surface portion of which an inner diameter increases as it approaches the first cylindrical portion.

The present invention can provide a shock absorber or the like that can reduce weight and cost.

BRIEF DESCRIPTION OF THE DRAWINGS

FIG. 2 is an enlarged view illustrating a main part of FIG. 1;

DETAILED DESCRIPTION OF THE INVENTION

Figure 1:
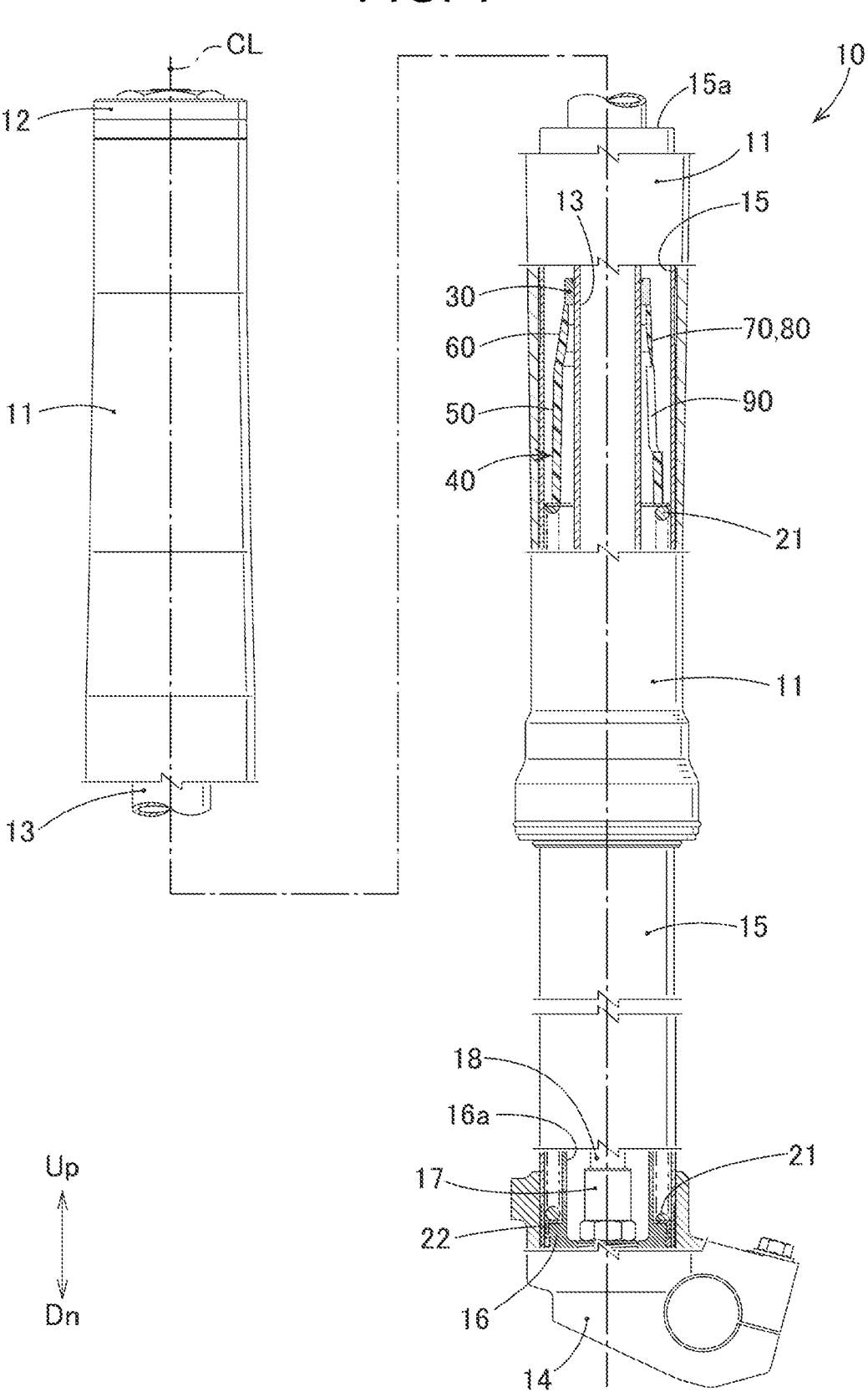
FIG. 1 is a cross-sectional view of a main part of a front fork according to a first example.

Embodiments of the present invention will be described below with reference to the accompanying drawings. In addition, a form illustrated in the accompanying drawings is an example of the present invention, and the present invention is not limited to the form. In the description, left and right refer to left and right with respect to an occupant in a vehicle, and front and rear refer to front and rear with respect to a traveling direction of the vehicle. In the drawings, Up indicates an upper side and Dn indicates a lower side.

First Example

A shock absorber 10 of a first example will be described with reference to FIGS. 1 to 6.

Figure 2:
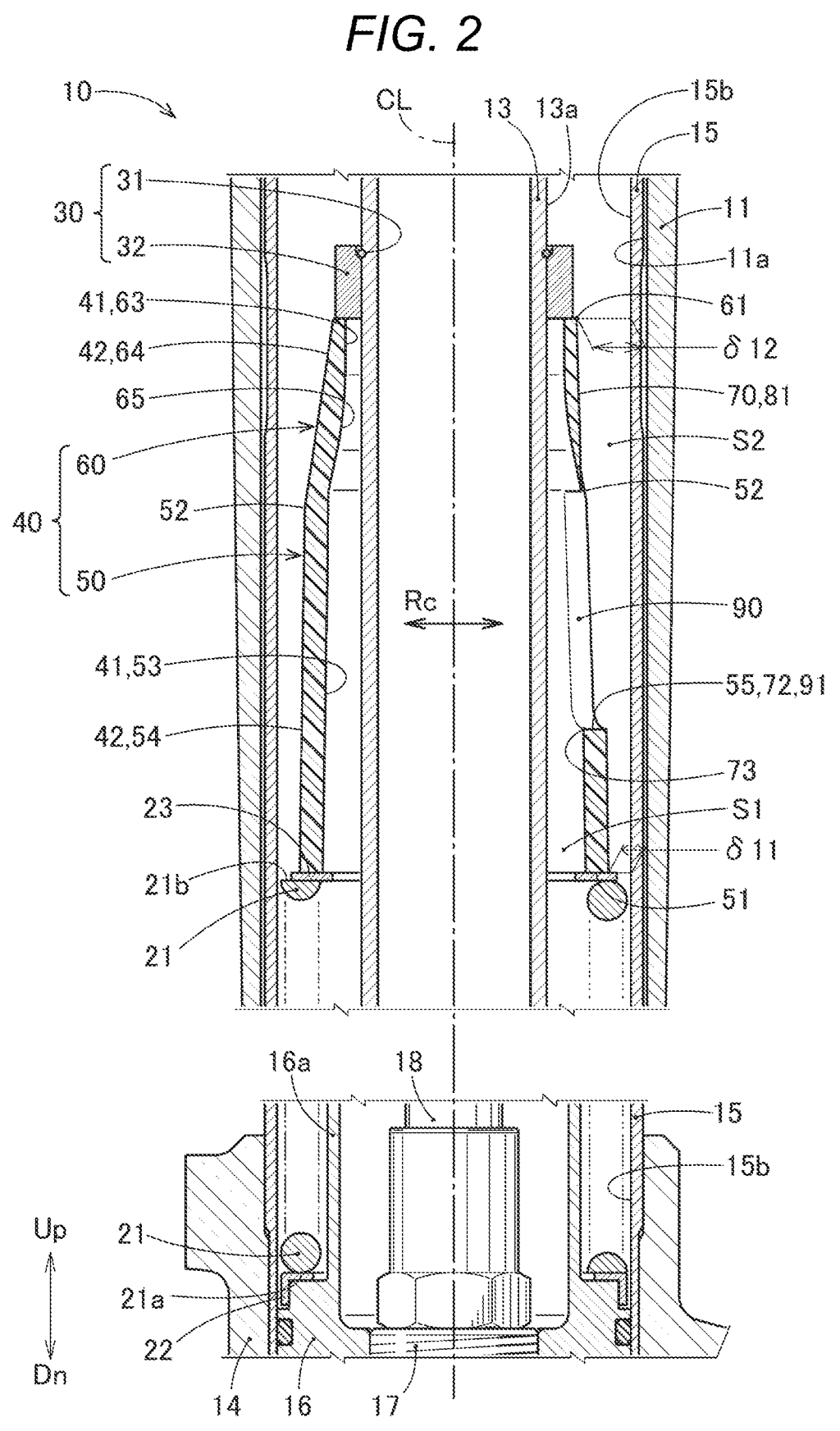

As illustrated in FIGS. 1 and 2, the shock absorber 10 is an inverted-type hydraulic shock absorber provided as a front fork in a straddle-type vehicle such as a motorcycle or a tricycle, and filled with oil. Hereinafter, the shock absorber 10 may be referred to as a "front fork 10" as appropriate.

The front fork 10 includes an outer tube 11 having a cylindrical shape and supported by a vehicle body, a closing member 12 closing an upper end of the outer tube 11, a cylinder 13 (first cylindrical body 13) having a cylindrical shape, supported by the closing member 12 and extending inside the outer tube 11, and a bracket 14 positioned at a lower end and supporting an axle of a front wheel.

The front fork 10 further includes an inner tube 15 (second cylindrical body 15), which is a cylindrical body extending upward from a bracket 14 and of which a tip end 15a exists inside the outer tube 11, and a closing member 16 which closes a lower end of the inner tube 15 and is fixed to the inside of the bracket 14.

The closing member 16 is threaded onto the bracket 14 using a bolt member 17. A rod 18, which is a cylindrical member supported by the bolt member 17, is provided with a piston (not illustrated) at its tip end.

A spring 21 provided between an outer peripheral surface 13a of the cylinder 13 and an inner peripheral surface 15b of the inner tube 15 applies force to the cylinder 13 and the inner tube 15 in a direction of separating them from each other. The spring 21 is configured by, for example, a compression coil spring. A lower spring seat portion 22 which receives a lower end 21a (first end 21a) of the spring 21 is supported by the closing member 16. A spring seat portion 40 (upper spring seat portion 40) supporting an upper end 21b (second end 21b) of the spring 21 via a spring seat 23 is provided between the outer peripheral surface 13a of the cylinder 13 and the inner peripheral surface 15b of the inner tube 15. The presence or absence of the spring seat 23 is optional. The spring seat portion 40 is sometimes referred to as a spring seat portion or a separator. Details of the spring seat portion 40 will be described below.

The front fork 10 is compressed so that the bracket 14 and the closing member 12 are closer together when a front wheel runs over a step or when a vehicle lands after jumping. The oil filled inside generates a damping force when compressed. When this front fork 10 is compressed to a predetermined position, the force of the spring 21 extends it so as to return to its original position. It is configured so that the oil filled inside generates a damping force even when it extends. The damping force generated by the oil absorbs an impact energy received when running over a step or when landing after jumping.

The front fork 10 will be described in more detail below.

As illustrated in FIG. 2, axes CL (centerlines CL) of the cylinder 13, the outer tube 11, and the inner tube 15 coincide with each other.

A material of the cylinder 13 is, for example, aluminum or an aluminum alloy. The cylinder 13 has an oil chamber filled with oil therein.

For a material of the inner tube 15, for example, aluminum, aluminum alloy, iron, or the like can be used. The inner tube 15 surrounds the outer peripheral surface 13a of the cylinder 13 and the spring 21 and is arranged along an inner peripheral surface 11a of the outer tube 11. The inner tube 15 is relatively movable with respect to the outer tube 11 and the cylinder 13 in an up-down direction (axis CL direction).

The closing member 16 supports the lower end 21a of the spring 21 through a lower spring seat 22. The closing member 16 extends upward inside the spring 21 and has a guide portion 16a for guiding the spring 21 in the axis CL direction.

The rod 18 has its tip end inside the cylinder 13. Thereby, a piston provided at a tip end of the rod 18 can move along the axis CL of the cylinder 13 in the oil chamber existing inside the cylinder 13.

The spring seat portion 40 is a cylindrical member made of resin. A hard resin such as a thermoplastic resin is preferably used as the resin material. The resin that forms the spring seat portion 40 is not particularly limited, and any resin that can withstand usage environment of the front fork 10 can be used as appropriate. An engineering plastic can be exemplified as such a resin.

A movement of the spring seat portion 40 upward in a direction opposite to the spring 21 with respect to the outer peripheral surface 13 a of the cylinder 13 is restricted by a movement restriction portion 30. Therefore, the spring seat portion 40 is rotatably provided with its upward movement restricted with respect to the outer peripheral surface 13a of the cylinder 13. For example, the movement restriction portion 30 is formed of a retaining ring 31 fitted to the outer peripheral surface 13a of the cylinder 13, and an stopper 32 having an annular shape and fitted to the outer peripheral surface 13a of the cylinder 13 while the upward movement is restricted by the retaining ring 31. The movement restriction portion 30 may be configured only by the retaining ring 31.

The spring seat portion 40 is described in more detail below.

Figure 3:
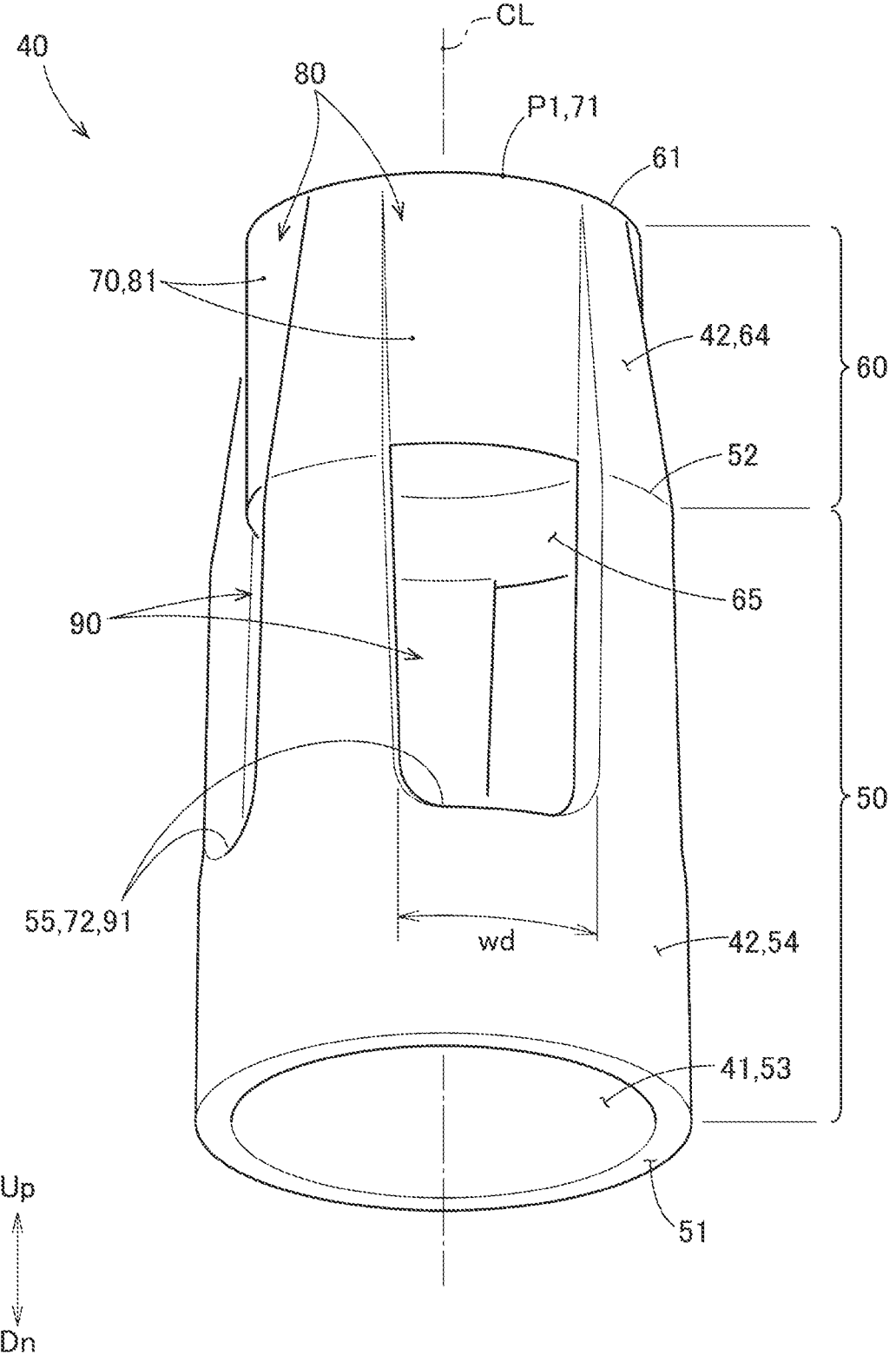
FIG. 3 is a perspective view of a spring seat portion illustrated in FIG. 2.
Figure 4:
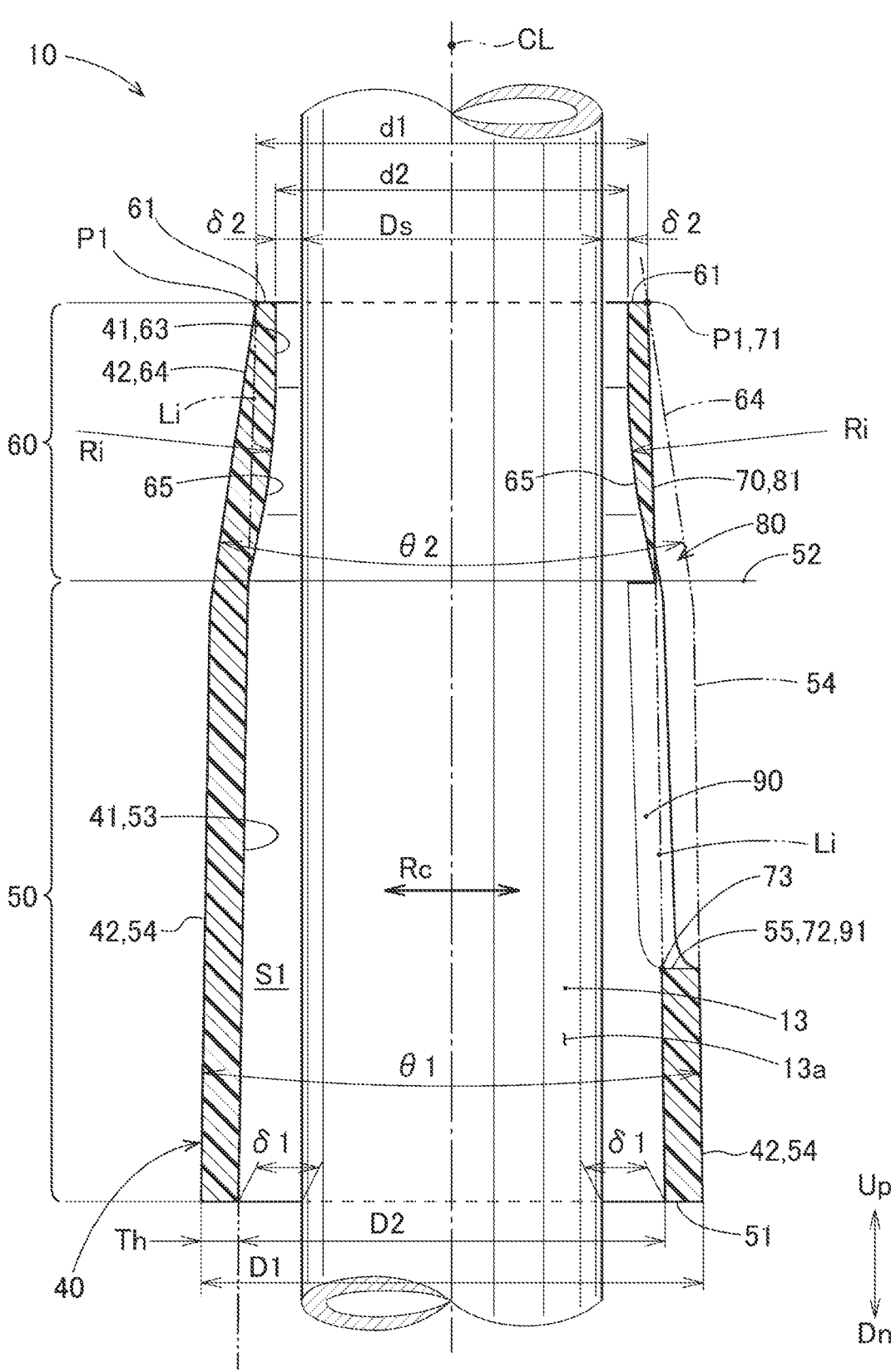
FIG. 4 is an enlarged view of a cylinder and the spring seat portion illustrated in FIG. 2.

As illustrated in FIGS. 2 to 4, the spring seat portion 40 includes a first cylindrical portion 50 having a cylindrical shape that supports an end portion 21b (upper end 21b) of the spring 21, and a second cylindrical portion 60 having a cylindrical shape that continuously extends from the first cylindrical portion 50 to a side opposite to the spring 21.

The first cylindrical portion 50 is a hollow truncated conical portion of which inner and outer diameters decrease from a lower end surface 51 supporting the end portion 21b of the spring 21 toward an upper end 52. As illustrated in FIG. 4, a taper angle of an outer peripheral surface 54 of the first cylindrical portion 50 is θ1. An outer diameter of the lower end surface 51 of the first cylindrical portion 50 is D1. An inner diameter of the lower end surface 51 of the first cylindrical portion 50 is D2. A thickness Th (a thickness Th in a radial direction of the spring seat portion 40) of the first cylindrical portion 50 is uniform. The lower end surface 51 supports the end portion 21b of the spring 21. The outer diameter D1 is greater than an outer diameter at the upper end 52 of the first cylindrical portion 50, and the inner diameter D2 is greater than an inner diameter at the upper end 52.

As illustrated in FIG. 4, the second cylindrical portion 60 is a hollow truncated conical portion of which inner diameter and outer diameter decrease as it goes away from the upper end 52 of the first cylindrical portion 50 toward a side opposite to the first cylindrical portion 50.

A taper angle of an outer peripheral surface 64 of the second cylindrical portion 60 is θ2. The taper angle θ2 of the outer peripheral surface 64 of the second cylindrical portion 60 is greater than the taper angle θ1 of the outer peripheral surface 54 of the first cylindrical portion 50.

In the second cylindrical portion 60, an intersection point P1 between an upper end surface 61 and the outer peripheral surface 64 is referred to as a first point P1. For example, in a cross-sectional view illustrated in FIG. 4, the first point P1 exists on an imaginary straight line Li obtained by extending an inner peripheral surface 53 of the first cylindrical portion 50, which is a surface inclined with respect to the centerline CL of the spring seat portion 40, toward the second cylindrical portion 60 as it is.

An outer diameter d1 of an upper end surface 61 of the second cylindrical portion 60 is smaller than the outer diameter D1 of the lower end surface 51 of the first cylindrical portion 50. An inner diameter d2 of the upper end surface 61 of the second cylindrical portion 60 is smaller than the inner diameter D2 of the lower end surface 51 of the first cylindrical portion 50 and larger than an outer diameter Ds of the cylinder 13.

In a state where the centerline CL of the spring seat portion 40 is aligned with the centerline CL of the cylinder 13, an outer peripheral surface 13a of the cylinder 13 and an inner peripheral surface 41 (the inner peripheral surface 53 of the first cylindrical portion 50 and an inner peripheral surface 63 of the second cylindrical portion 60) of the spring seat portion 40 are not in contact, and there is a gap S1 between the outer peripheral surface 13a of the cylinder 13 and the inner peripheral surface 53 of the first cylindrical portion 50 and the inner peripheral surface 63 of the second cylindrical portion 60. In a state where the centerline CL of the spring seat portion 40 is aligned with the centerline CL of the cylinder 13, an interval δ1 between the inner peripheral surface 53 of the first cylindrical portion 50 and the outer peripheral surface 13a of the cylinder 13 at the lower end surface 51 of the first cylindrical portion 50 is greater than an interval δ2 between the inner peripheral surface 63 of the second cylindrical portion 60 and the outer peripheral surface 13a of the cylinder 13 at the upper end surface 61 of the second cylindrical portion 60.

As illustrated in FIG. 2, in a state where the centerline CL of the spring seat portion 40 is aligned with the centerline CL of the cylinder 13, the inner peripheral surface 15b of the inner tube 15 and an outer peripheral surface 42 (the outer peripheral surface 54 of the first cylindrical portion 50 and the outer peripheral surface 64 of the second cylindrical portion 60) of the spring seat portion 40 are not in contact, and there is a gap S2 between the inner peripheral surface 15b of the inner tube 15 and the outer peripheral surface 54 of the first cylindrical portion 50 and the outer peripheral surface 64 of the second cylindrical portion 60. In a state where the centerline CL of the spring seat portion 40 is aligned with the centerline CL of the cylinder 13, an interval δ11 between the outer peripheral surface 54 of the first cylindrical portion 50 and the inner peripheral surface 15b of the inner tube 15 at the lower end surface 51 of the first cylindrical portion 50 is greater than an interval δ12 between the outer peripheral surface 64 of the second cylindrical portion 60 and the inner peripheral surface 15b of the inner tube 15 at the upper end surface 61 of the second cylindrical portion 60.

In this way, the spring seat portion 40 is arranged so as to be movable in a direction that intersects the axis CL of the cylinder 13, and the spring seat portion 40 can be arranged so that the outer peripheral surface 13a of the cylinder 13 and the spring seat portion 40 are not in contact with each other when the centerline CL of the cylinder 13 is aligned with the centerline CL of the spring seat portion 40. The spring seat portion 40 is also arranged to be able to come into contact with the inner peripheral surface 15b of the inner tube 15.

As illustrated in FIG. 4, the inner peripheral surface 63 of the second cylindrical portion 60 includes a curved surface portion 65 of which an inner diameter increases as it approaches the first cylindrical portion 50. In more detail, the curved surface portion 65 is a curved surface with a curvature radius Ri of which a diameter gradually expands from the upper end surface 61 side of the second cylindrical portion 60 to the upper end 52 of the first cylindrical portion 50 and which becomes convex toward the centerline CL side of the spring seat portion 40 over the entire circumference.

Furthermore, as illustrated in FIGS. 3 and 4, the spring seat portion 40 has at least one biased portion 70 in which a part of the outer peripheral surface 42 of the spring seat portion 40 is partially biased toward the inner peripheral surface 41 side. The biased portion 70 is a surface of the spring seat portion 40 that is biased toward the centerline CL side from the outer peripheral surface 42 (the outer peripheral surface 64 of the second cylindrical portion 60 shown by an imaginary line in FIG. 4), and is a surface that is less inclined with respect to the centerline CL than a portion of the outer peripheral surface 42 other than the biased portion 70. Since the thickness of at least the second cylindrical portion 60 is reduced by the biased portion 70 in the spring seat portion 40, weight of the spring seat portion 40 can be easily reduced.

An upper end 71 of the biased portion 70 coincides with the first point P1. The biased portion 70 extends from the upper end surface 61 of the second cylindrical portion 60 to an intermediate position 55 of the first cylindrical portion 50 in a longitudinal direction. This intermediate position 55 forms an edge 72 of a lower end of the biased portion 70. An intersection point 73 between the edge 72 of the lower end of the biased portion 70 and an extension line Li of the inner peripheral surface 53 of the first cylindrical portion 50 is referred to as a lower end 73 of the biased portion 70. Preferably, the biased portion 70 is positioned on the straight line Li passing through the upper end 71 and the lower end 73, that is, on the extension line Li of the inner peripheral surface 53. The reason for this will be described below.

The biased portion 70 is formed of, for example, a "groove 80" located on the outer peripheral surface 42 of the spring seat portion 40 and extending from the upper end surface 61 of the second cylindrical portion 60 toward the lower end surface 51 of the first cylindrical portion 50. A bottom surface 81 of this groove 80 is the biased portion 70. A width (a groove width of the groove 80) of the biased portion 70 in a circumferential direction illustrated in FIG. 3 is wd.

Further, the spring seat portion 40 has a through hole 90 (oil passage hole 90) through which oil can pass, bored in a direction Rc that intersects the centerline CL of the spring seat portion 40. The through hole 90 is located in the groove 80 with the biased portion 70 as its bottom surface. In other words, the through hole 90 is bored in the bottom surface 81 of the groove 80.

For example, the through hole 90 is a rectangular hole that extends over a range from the upper end 52 of the first cylindrical portion 50 to the lower end 73 of the biased portion 70 and spans an entire width Wd (see FIG. 3) of the biased portion 70. The position of the lower end 73 of the biased portion 70 relative to the second cylindrical portion 60 is determined by a position of an edge 91 of a lower end of the through hole 90. A position of the edge 91 of the lower end of the through hole 90 is set in consideration of oil passage performance.

The reason why the biased portion 70 (the bottom surface 81 of the groove 80) is located on the extension line Li of the inner peripheral surface 53 of the first cylindrical portion 50 will now be described. As the biased portion 70 is aligned with the inner peripheral surface 53, the through hole 90 is formed in the first cylindrical portion 50 in the direction Rc intersecting the centerline CL of the spring seat portion 40. Therefore, when forming the through hole 90 by resin molding, it is not necessary to use a mold that is pulled out in a direction intersecting the centerline CL, which is used when manufacturing a spring seat portion of the related art. Therefore, it is possible to reduce the manufacturing cost of the spring seat portion. This is why the biased portion 70 is located on the extension line Li.

An angle difference Δθ (not illustrated) between the taper angle θ1 of the outer peripheral surface 54 of the first cylindrical portion 50 and the taper angle θ2 of the outer peripheral surface 64 of the second cylindrical portion 60 is set to be optimized by considering the size δ2 of the gap S1 on the upper end surface 61 of the second cylindrical portion 60, the position and depth of the biased portion 70, and the position and size of the through hole 90.

Next, an operation of the front fork 10 will be described.

Figure 5:
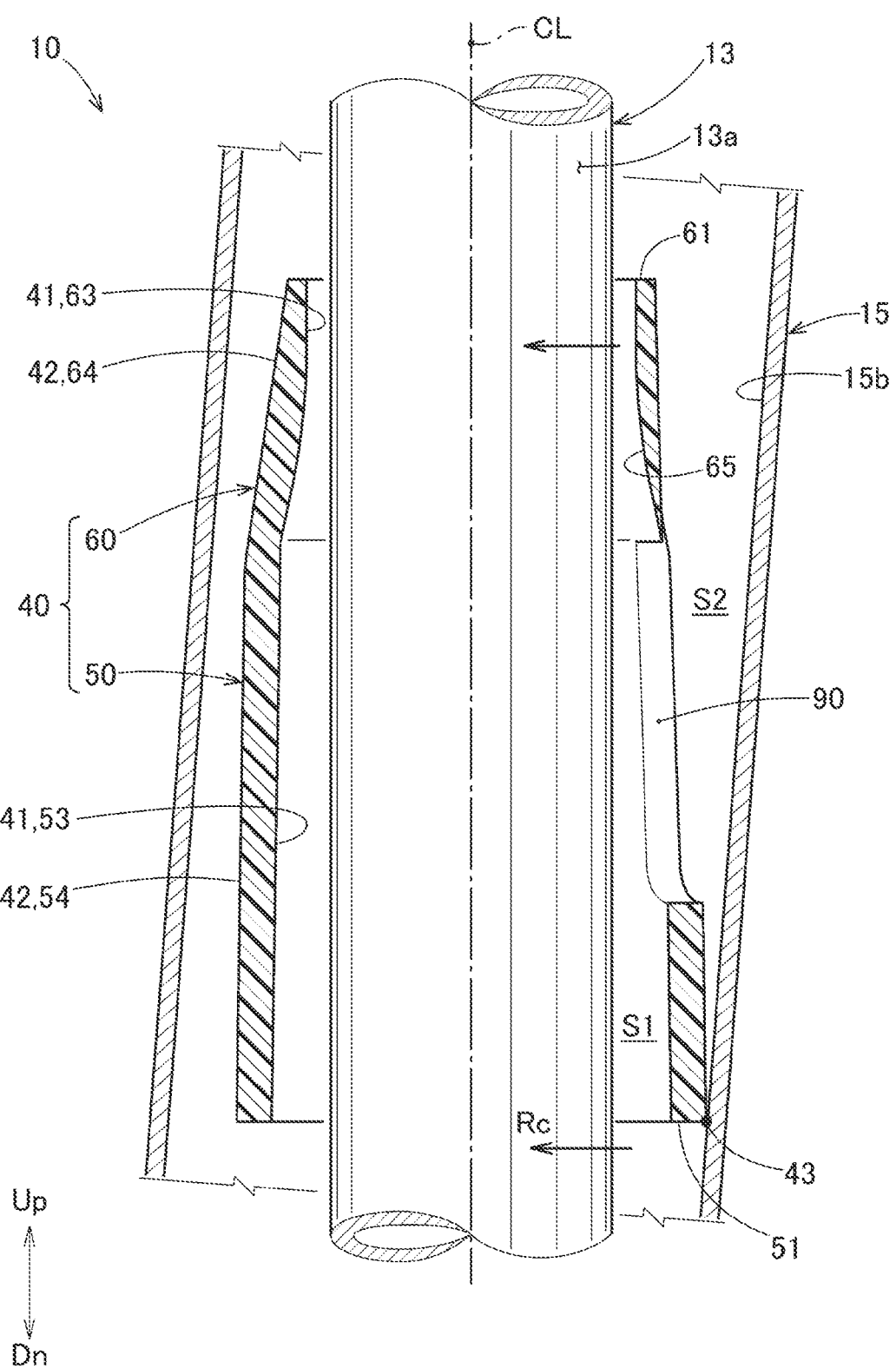
FIG. 5 is a view illustrating a form in which an inner tube bends and pushes the spring seat portion.

While the saddle type vehicle is traveling, the front fork 10 illustrated in FIG. 2 receives a bending load (a force in the direction Rc intersecting an axial direction of the front fork 10) via a front wheel. As illustrated in FIG. 5, the inner tube 15 receiving a bending load is elastically deformed in the direction Rc intersecting the axial direction of the front fork 10, and pushes a corner 43 of a lower end of the spring seat portion 40 in the direction Rc.

Figure 6:
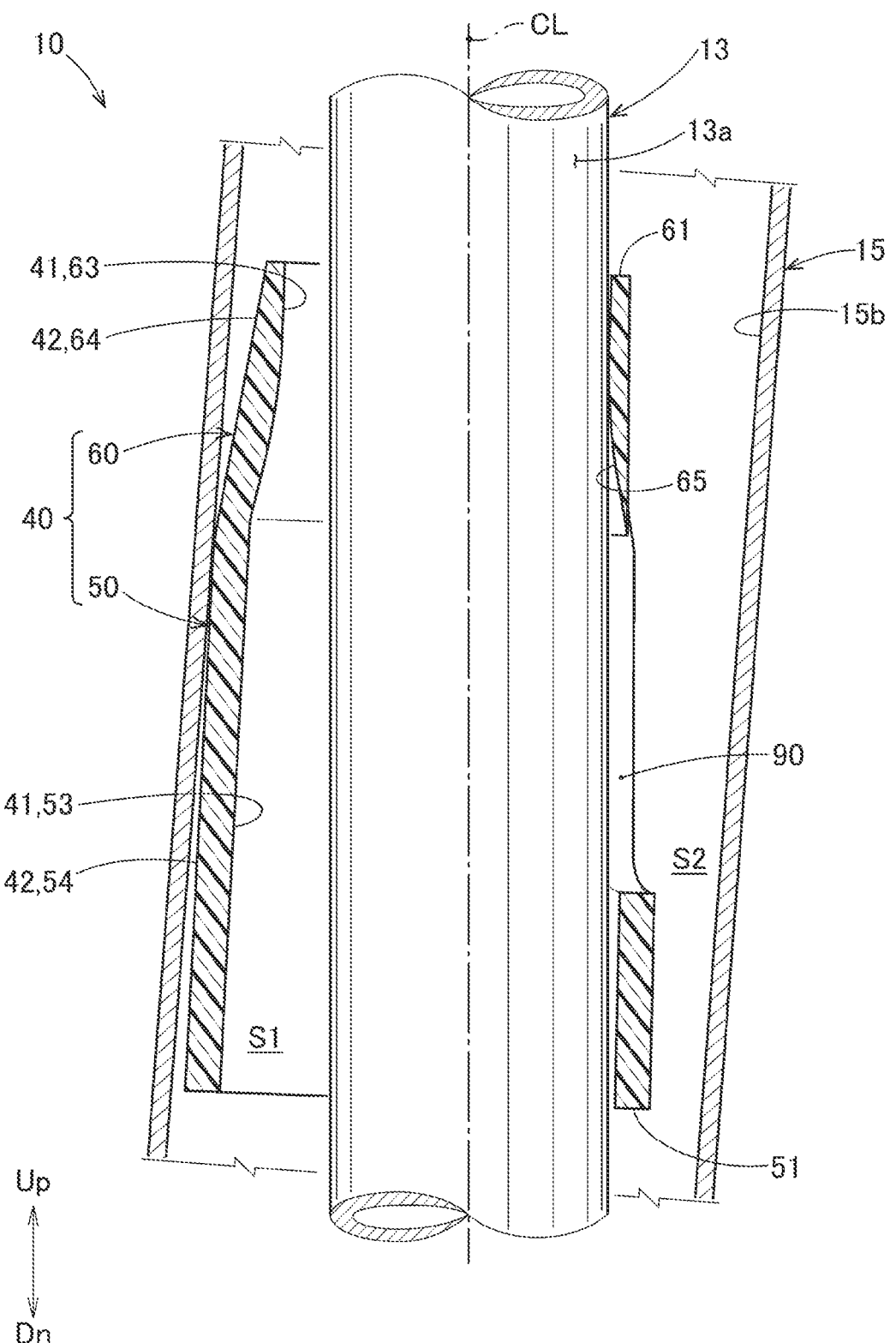
FIG. 6 is a view illustrating the pushed spring seat portion.

The gap S1 is provided between the outer peripheral surface 13a of the cylinder 13 and the inner peripheral surface 41 of the spring seat portion 40. As illustrated in FIG. 5, the pushed spring seat portion 40 can reduce effects of bending loads by tilting eccentrically by the gap S1 in the direction Rc. In other words, bending loads acting from the cylinder 13 to the spring seat portion 40 can be relieved. When the spring seat portion 40 is pushed further, the curved surface portion 65 abuts on the outer peripheral surface 13a of the cylinder 13. As illustrated in FIG. 6, the pushed spring seat portion 40 tilts the lower end surface 51 of the first cylindrical portion 50 toward the outer peripheral surface 13a of the cylinder 13 using the curved surface portion 65 having a curved surface shape as a fulcrum, thereby reducing the effect of bending loads.

The description of the configuration of the shock absorber 10 (front fork 10) of the first example is summarized as follows.

As illustrated in FIG. 2, the shock absorber 10 includes the first cylindrical body 13 (cylinder 13) formed in a cylindrical shape, and the second cylindrical body 15 (inner tube 15) which is a cylindrical body provided to surround the outer peripheral surface 13a of the first cylindrical body 13 and is provided movably in the direction of the axis CL (centerline CL) with respect to the first cylindrical body 13. The shock absorber 10 further includes the spring 21 provided between the outer peripheral surface 13a of the first cylindrical body 13 and the inner peripheral surface 15b of the second cylindrical body 15 to apply a force in a direction of separating the first cylindrical body 13 and the second cylindrical body 15. The shock absorber 10 further includes the spring seat portion 40 made of resin which is a cylindrical body supporting the end portion 21b of the spring 21 in the axis CL direction and provided between the outer peripheral surface 13a of the first cylindrical body 13 and the inner peripheral surface 15b of the second cylindrical body 15, and is arranged movably in the direction Rc intersecting the axis CL direction.

While the saddle type vehicle is traveling, the shock absorber 10 receives a bending load via the front wheel. The second cylindrical body 15 that receives the bending load elastically deforms in the direction Rc intersecting the axial direction CL of the shock absorber 10, and pushes the spring seat portion 40 in this direction Rc. Since there is the gap S1 between the outer peripheral surface 13*a* of the cylinder 13 and the inner peripheral surface 41 of the spring seat portion 40, the spring seat portion 40 can move in the direction Rc. The pushed spring seat portion 40 can reduce the effect of the bending load by moving by the gap S1 in the direction Rc while tilting. In other words, since the bending load acting on the spring seat portion 40 can be relieved through the second cylindrical body 15, strength of the spring seat portion 40 can be lowered than the related art. Therefore, it is possible to construct the spring seat portion 40 from a lightweight and low-cost resin product. By adopting this spring seat portion 40 made of resin, the weight and cost of the shock absorber 10 can be reduced.

In addition, while the saddle type vehicle is traveling, the spring 21 receives a force in a direction of rotation about the axis CL. The spring seat portion 40, which supports the spring 21, also receives a force in the direction of rotation about the axis CL. The spring seat portion 40 is made of a resin material and is fitted to the outer peripheral surface 13*a* of the first cylindrical body 13 with the gap S1 so as to be able to come into direct contact therewith. Therefore, even when the spring seat portion 40 comes into contact with the outer peripheral surface 13*a* of the first cylindrical body 13 when rotating, frictional resistance with respect to the outer peripheral surface 13*a* of the first cylindrical body 13 can be reduced.

Further, as illustrated in FIGS. 2 and 4, the spring seat portion 40 includes the first cylindrical portion 50 having a cylindrical shape and supporting the upper end 21*b*, which is the end portion of the spring 21, and the second cylindrical portion 60 having a cylindrical shape and continuously extending from the first cylindrical portion 50 to a side opposite to the spring 21. The outer diameter d1 of the second cylindrical portion 60 is smaller than the outer diameter D1 of the first cylindrical portion 50. The inner diameter d2 of the second cylindrical portion 60 is smaller than the inner diameter D2 of the first cylindrical portion 50. The inner peripheral surface 63 of the second cylindrical portion 60 has the curved surface portion 65 of which the inner diameter increases as it approaches the first cylindrical portion 50.

As illustrated in FIG. 6, the spring seat portion 40 pushed by the second cylindrical body 15 that receives the bending load can tilt and move by the gap S1 in the direction Rc with the curved surface portion 65 having a curved surface shape as a fulcrum. This makes it easier to release the bending load received via the second cylindrical body 15.

Further, as illustrated in FIGS. 3 and 4, the spring seat portion 40 has the biased portion 70 in which a part of the outer peripheral surface 42 of the spring seat portion 40 is partially biased toward the inner peripheral surface 41 side.

The portion where the biased portion 70 is arranged is thinner than the other portions. In particular, by making the taper angle θ2 of the outer peripheral surface 64 of the second cylindrical portion 60 larger than the taper angle θ1 of the outer peripheral surface 54 of the first cylindrical portion 50, as illustrated in FIG. 4, it is easy to gradually increase the thickness of the biased portion 70 from the lower end of the second cylindrical portion 60 toward the upper end surface 61. Accordingly, a relatively large oil flow path can be provided between the inner peripheral surface 15*b* of the second cylindrical body 15 and the biased portion 70. As a result, it is possible to reduce the flow resistance of the oil flowing through the gap S2 between the inner peripheral surface 15*b* of the second cylindrical body 15 and the outer peripheral surface 42 of the spring seat portion 40, thereby facilitating the flow of the oil.

Furthermore, as illustrated in FIGS. 3 and 4, the spring seat portion 40 has the through hole 90 bored in the direction Rc intersecting the centerline CL of the spring seat portion 40. The through hole 90 is bored the biased portion 70.

Since the through hole 90 is bored the biased portion 70, oil easily flows from the inside of the spring seat portion 40 through the through hole 90 and through the gap S2 between the inner peripheral surface 15*b* of the second cylindrical body 15 and the outer peripheral surface 42 of the spring seat portion 40.

More specifically, as illustrated in FIGS. 2 to 4, the shock absorber 10 includes the first cylindrical body 13 (cylinder 13) formed in a cylindrical shape, and the second cylindrical body 15 (inner tube 15) which is a cylindrical body provided to surround the outer peripheral surface 13*a* of the first cylindrical body 13 and is provided movably in the direction of the axis CL with respect to the first cylindrical body 13. The shock absorber 10 further includes the spring 21 provided between the outer peripheral surface 13*a* of the first cylindrical body 13 and the inner peripheral surface 15*b* of the second cylindrical body 15 to apply a force in a direction of separating the first cylindrical body 13 and the second cylindrical body 15. The shock absorber 10 further includes the spring seat portion 40 made of resin which is a cylindrical body supporting the upper end 21*b*, which is the end portion of the spring 21, provided between the outer peripheral surface 13*a* of the first cylindrical body 13 and the inner peripheral surface 15*b* of the second cylindrical body 15, and arranged movably in the direction intersecting the axis CL. The spring seat portion 40 includes the first cylindrical portion 50 having a cylindrical shape and supporting the upper end 21*b*, which is the end portion of the spring 21, and the second cylindrical portion 60 having a cylindrical shape and continuously extending from the first cylindrical portion 50 to the side opposite to the spring 21. The spring seat portion 40 further includes the groove 80 positioned on the outer peripheral surface 42 of the spring seat portion 40 and extending from a tip end surface 61 of the second cylindrical portion 60 toward a tip end surface 51 of the first cylindrical portion 50, and the through hole 90 located in the bottom surface 81 of the groove 80 and bored in the direction Rc intersecting the centerline CL of the spring seat portion 40. The outer diameter d1 of the second cylindrical portion 60 is smaller than the outer diameter D1 of the first cylindrical portion 50. The inner diameter d2 of the second cylindrical portion 60 is smaller than the inner diameter D2 of the first cylindrical portion 50. The inner peripheral surface 63 of the second cylindrical portion 60 has the curved surface portion 65 of which the inner diameter increases as it approaches the first cylindrical portion 50.

Next, a method of manufacturing the shock absorber 10 (front fork 10) of the first example will be described with reference to FIGS. 4 and 7 to 13. The spring seat portion 40 of the front fork 10 is manufactured through a mold preparation process, a mold clamping process, a filling process, a mold opening process, and a removal process.

Figure 7:
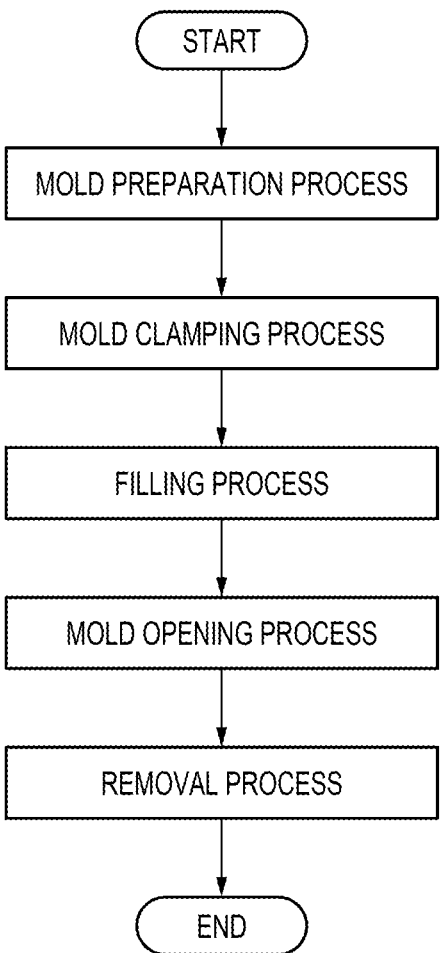
FIG. 7 is a flowchart illustrating a method of manufacturing the spring seat portion illustrated in FIG. 4.
Figures 8, 9:
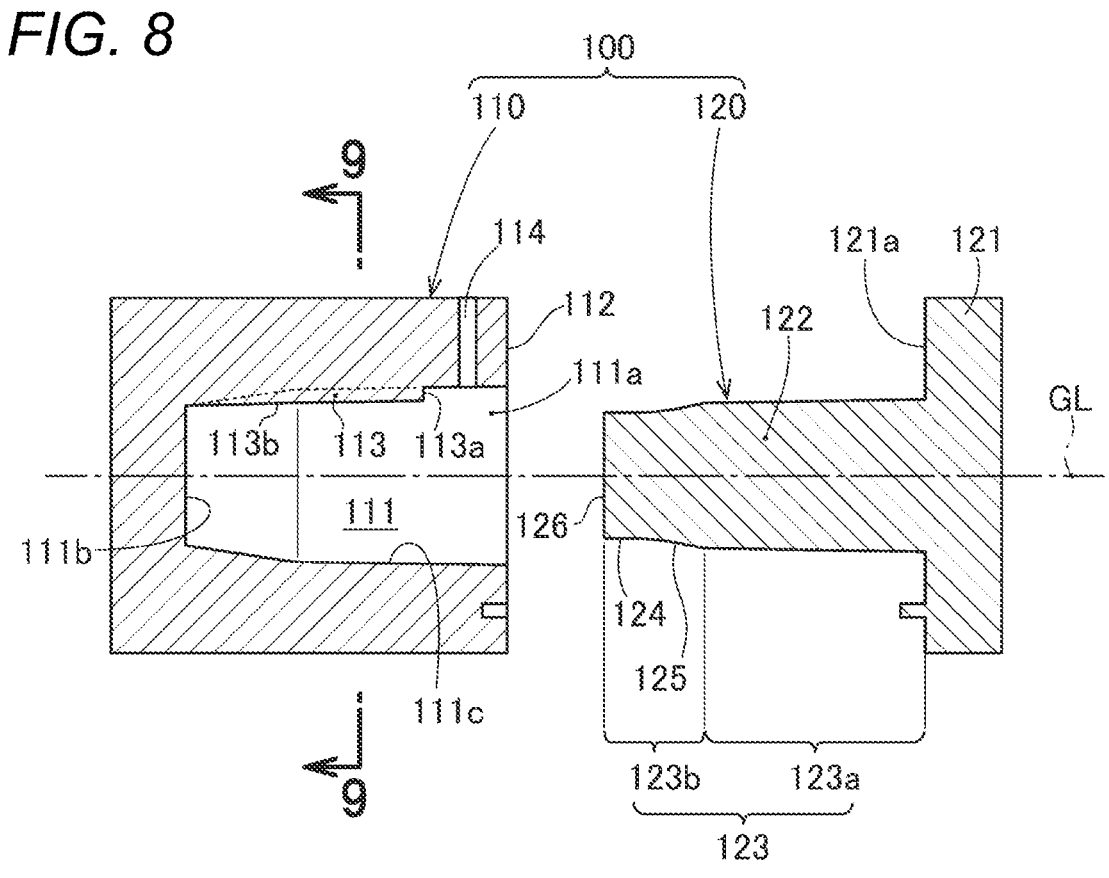
FIG. 8 is a view for illustrating a mold preparation process illustrated in FIG. 7.
FIG. 9 is a cross-sectional view taken along the line 9-9 in FIG. 8.

When manufacturing the spring seat portion 40, as illustrated in FIGS. 7 to 9, a molding die 100 for resin-molding the spring seat portion 40 (see FIG. 4) is prepared (mold preparation process). FIG. 8 represents, in exploded cross-section, a molding die 100 for molding the spring seat portion 40. The molding die 100 includes a first mold 110 forming a female mold (cavity) for forming the outer peripheral surface 42 of the spring seat portion 40, and a second mold 120 forming a male mold (core) for forming the inner peripheral surface 41 of the spring seat portion 40.

The first mold 110 includes a hollow portion 111 with a bottom having an open end 111a as a first end that an end on a side receiving the second mold 120 and a bottom 111b with a flat shape as an end on a side opposite to the open end 111a in a centerline GL direction of the first mold 110. The centerline GL of hollow portion 111 coincides with the centerline CL of the spring seat portion 40 illustrated in FIG. 4. The open end 111a is located on a mold mating surface 112 of the first mold 110. An inner peripheral surface 111c of the hollow portion 111 is a surface for forming the outer peripheral surface 42 of the spring seat portion 40 illustrated in FIG. 4.

The first mold 110 further includes a protruding portion 113 that protrudes radially inward of the first mold 110 from a part of the inner peripheral surface 111c of the hollow portion 111. The protruding portion 113 is a part forming the groove 80 (biased surface 70) and the through hole 90 of the spring seat portion 40, and extends from the bottom 111b of the first mold 110 toward the open end 111a. A tip end surface 113a of the protruding portion 113 on the side of the open end 111a defines the edge 91 of the lower end of the through hole 90 of the spring seat portion 40 illustrated in FIG. 4. A width We of the protruding portion 113 defines the circumferential width wd of the biased portion 70 of the spring seat portion 40 and the groove width wd of the groove 80. An inner surface 113b of the protruding portion 113 in a radial direction is a curved surface.

The second mold 120 can be movably fitted into the first mold 110 in a direction along the centerline GL of the hollow portion 111, which is a direction along the centerline CL of the spring seat portion 40. This second mold 120 includes a flange 121 having a mold mating surface 121a that can be laminated on the mold mating surface 112 of the first mold 110, and a male mold portion 122 having a columnar shape and extending from the mold mating surface 121a of the flange 121 so as to be fitted into the hollow portion 111.

An outer peripheral surface 123 of the male mold portion 122 is a surface for forming the inner peripheral surface 41 of the spring seat portion 40 illustrated in FIG. 4. The outer peripheral surface 123 can move in the direction along the centerline GL of the hollow portion 111 while being in close contact with the inner surface 113b of the protruding portion 113 in the radial direction. The outer peripheral surface 123 of the male mold portion 122 includes a first outer peripheral surface 123a for forming the inner peripheral surface 53 of the first cylindrical portion 50 of the spring seat portion 40, and a second outer peripheral surface 123b for forming the inner peripheral surface 63 of the second cylindrical portion 60 of the spring seat portion 40.

The second mold 120 further includes an enlarged diameter portion 125 of which a diameter is enlarged in a curved surface shape from a tip end part 124 to be fitted into the first mold 110 toward the flange 121. The enlarged diameter portion 125 extends over the entire circumference of the second outer peripheral surface 123b of the male mold portion 122. The tip end part 124 is a part for forming the inner peripheral surface 63 of the second cylindrical portion 60 illustrated in FIG. 4. The enlarged diameter portion 125 is a part for forming the curved surface portion 65 of the spring seat portion 40 illustrated in FIG. 4.

Figure 10:
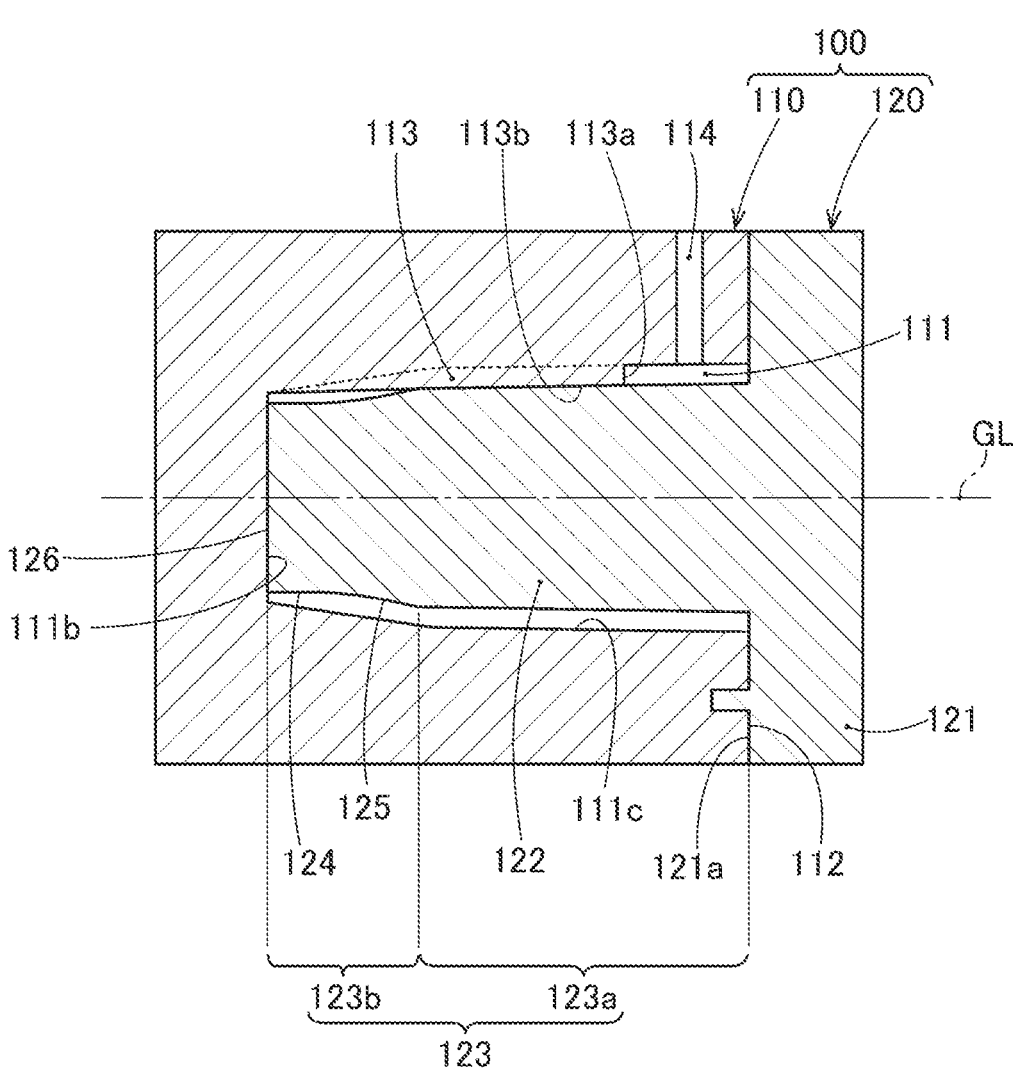
FIG. 10 is a view for illustrating a mold clamping process illustrated in FIG. 7.
Figure 11:
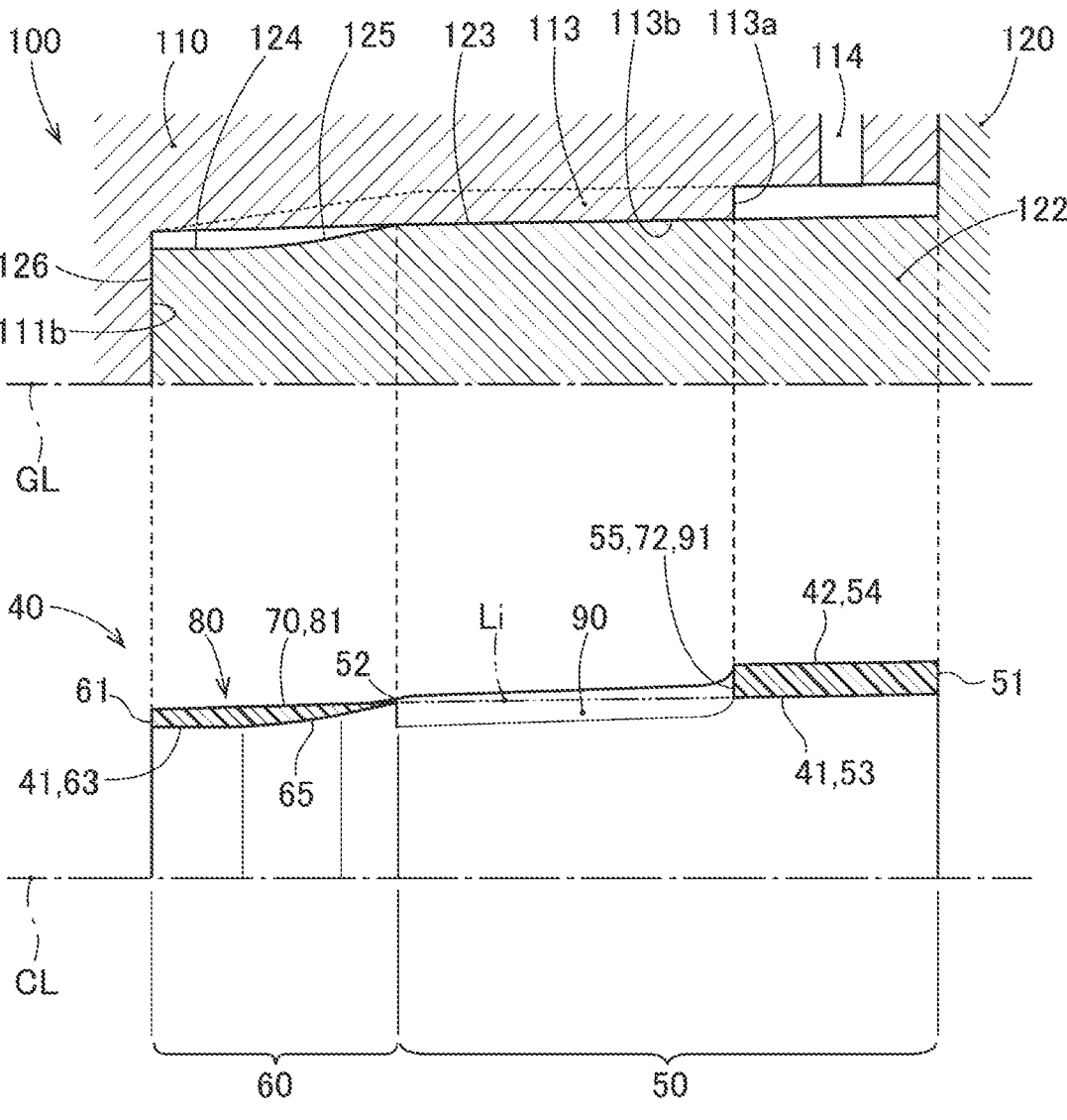
FIG. 11 is a view for illustrating a relationship between a clamped molding die and the spring seat portion.

After the first mold 110 and the second mold 120 are prepared in the mold preparation process, as illustrated in FIGS. 7, 10, and 11, the second mold 120 is clamped to the first mold 110 (mold clamping process). In a state where the second mold 120 is fitted into the first mold 110, the mold mating surfaces 112 and 121a are in close contact with each other, a tip end surface 126 of the male mold portion 122 is in close contact with the bottom 111b of the hollow portion 111, and the outer peripheral surface 123 of the male mold portion 122 is in close contact with the inner surface 113b of the protruding portion 113 in the radial direction.

Figure 12:
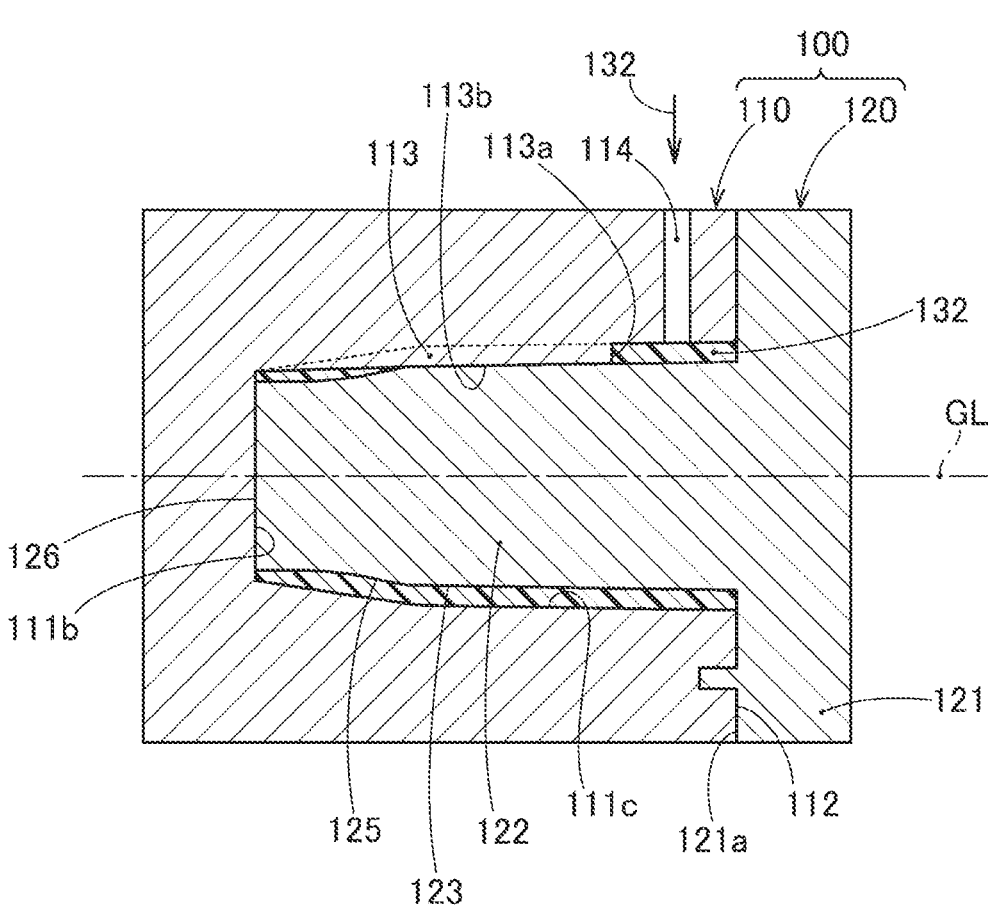
FIG. 12 is a view for illustrating a filling process illustrated in FIG. 7.

After the second mold 120 is mold-clamped against the first mold 110 in the mold clamping process, as illustrated in FIGS. 7 and 12, a part interposed between the first mold 110 and the second mold 120 is filled with a resin 132 in a liquid state from an injection molding machine (not illustrated) through a sprue 114 (including runners and gates not illustrated) (filling process).

Figure 13:
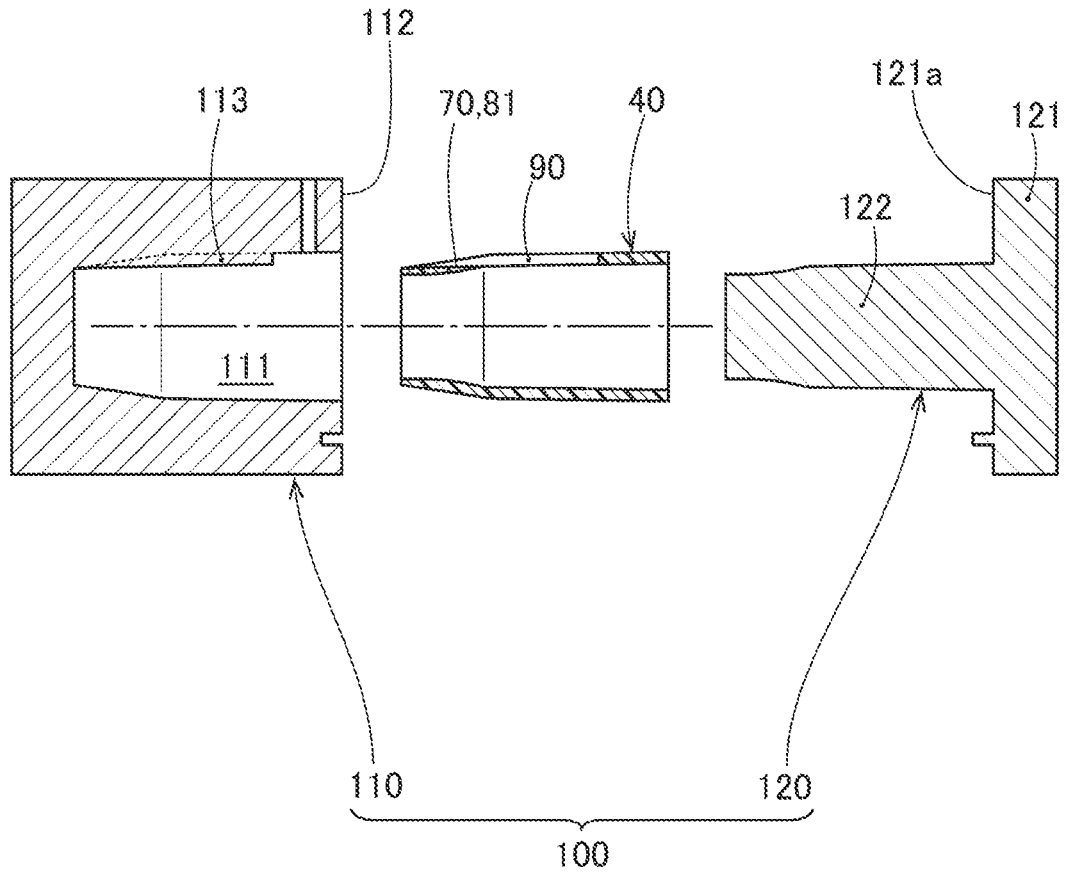
FIG. 13 is a view for illustrating a mold opening process and a removal process illustrated in FIG. 7.

After the resin 132 in a liquid state that is filled in the filling process has solidified, as illustrated in FIGS. 7 and 13, the second mold 120 is opened from the first mold 110 (mold opening process).

Next, as illustrated in FIGS. 7 and 13, the resin-molded spring seat portion 40 is removed from the hollow portion 111 (removal process). This completes the manufacture of the spring seat portion 40 of the front fork 10.

The description of the manufacturing method of the shock absorber 10 (front fork 10) of the first example is summarized as follows.

In the method of manufacturing the shock absorber 10, when manufacturing the spring seat portion 40, as illustrated in FIGS. 7 to 9, the mold preparation process is provided for preparing the first mold 110 forming the female mold for forming the outer peripheral surface 42 of the spring seat portion 40, and the second mold 120 forming the male mold for forming the inner peripheral surface 41 of the spring seat portion 40. The first mold 110 includes the protruding portion 113 that protrudes radially inward from the inner peripheral surface 111c of the female mold 110 (first mold 110) and extends from the bottom 111b of the female mold 110 toward the open end 111a. The second mold 120 includes the outer peripheral surface 123 that is fitted to the first mold 110 so as to be movable in the direction (the direction along the centerline GL of the hollow portion 111) along the centerline CL of the spring seat portion 40, and is movable in a moving direction of the male mold 120 (second mold 120) while coming in close contact with the inner surface 113b of the protruding portion 113 in the radial direction. In the method of manufacturing the shock absorber 10, there are further provided the mold clamping process (see FIGS. 7, 10, and 11) of mold-clamping the second mold 120 to the first mold 110 after the mold preparation process, and the filling process (see FIGS. 7 and 12) of filling a part interposed between the first mold 110 and the second mold 120 with the resin 132 in a liquid state after the mold clamping process. In the method of manufacturing the shock absorber 10, there are further provided the mold opening process (see FIGS. 7 and 13) in which the second mold 120 is opened from the first mold 110 after the resin filled in the filling process has hardened, and the removal process (see FIGS. 7 and 13) of removing the resin-molded spring seat portion 40 from the part after the mold opening process.

The first mold 110 includes the protruding portion 113 that protrudes radially inwardly of the first mold 110 from the inner peripheral surface 111c and extends from the bottom 111b of the first mold 110 toward the open end 111a. The second mold 120 includes the outer peripheral surface 123 that is in contact with the inner surface 113b of the protruding portion 113 in the radial direction and is movable in the moving direction of the second mold 120, which is a direction intersecting the radial direction. As illustrated in FIGS. 10 and 11, the outer peripheral surface 123 of the second mold 120 has the first outer peripheral surface 123a of the male mold portion 122 that is a part in contact with the inner surface 113b of the protruding portion 113 in the radial direction when the second mold 120 is mold-clamped to the first mold 110. This contact part is not filled with the resin 132. Therefore, the molding die 100 can mold both the biased portion 70 and the through hole 90 in a direction intersecting the biased portion 70 only with the first mold 110 and the second mold 120. Since the spring seat portion 40 made of resin can be manufactured by the molding die 100 that does not have a mold that is pulled out in a direction intersecting the centerline CL, which was used when manufacturing the spring seat portion of the related art, manufacturing costs can be reduced.

Furthermore, as illustrated in FIG. 11, the second mold 120 expands its diameter, as it goes rearward from the tip end part 124 that is fitted into the first mold 110, in a curved line shape over the entire circumference of the outer peripheral surface 123. That is, the second mold 120 includes the enlarged diameter portion 125.

The enlarged diameter portion 125 allows the curved surface portion 65 of the spring seat portion 40 to be formed. Accordingly, the curved surface portion 65 for easily releasing the bending load received through the second cylindrical body 15 can be easily formed.

Next, a shock absorber 200 (front fork 200) of a second example will be described with reference to FIG. 14.

Second Example

Figure 14:
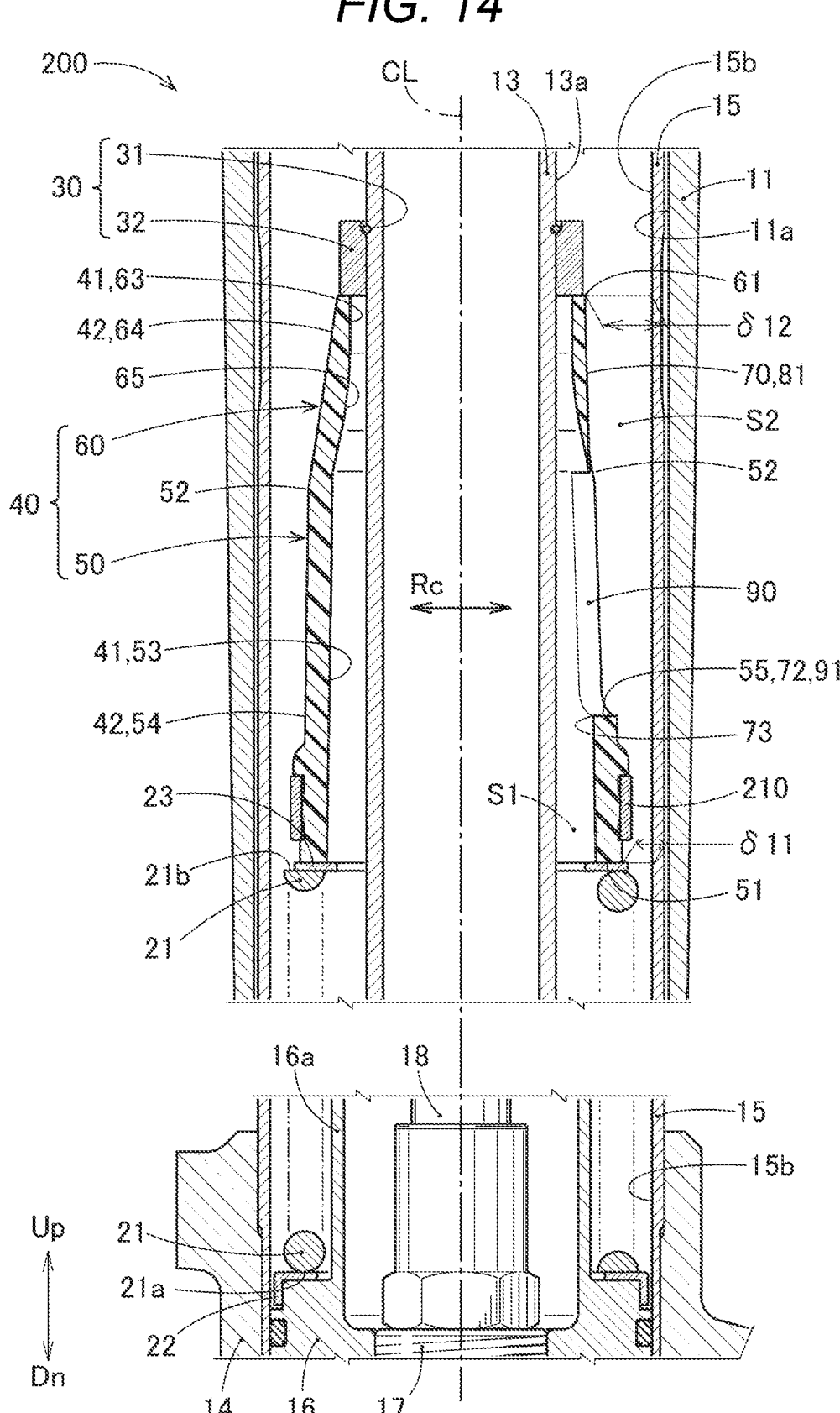
FIG. 14 is an enlarged view of a main part of a front fork according to a second example.

FIG. 14 is an enlarged view of a main part of the shock absorber 200, corresponding to FIG. 2 illustrating the shock absorber 10. The shock absorber 200 illustrated in FIG. 14 is characterized by having a sliding member 210 in the spring seat portion 40 of the shock absorber 10 illustrated in FIG. 2, and other basic configurations thereof are the same as those of the shock absorber 10. In the description of the shock absorber 200, the same reference numerals and letters are used for parts common to those of the shock absorber 10, and detailed description of the common parts will be omitted.

The outer peripheral surface 54 of the first cylindrical portion 50 of the spring seat portion 40 is provided with the sliding member 210 having an annular shape and slidable on the inner peripheral surface 15b of the inner tube 15 (second cylindrical body 15). The sliding member 210 is made of a material of which the coefficient of friction (coefficient of static friction and coefficient of dynamic friction) is smaller than that of the spring seat portion 40. Preferably, a polytetrafluoroethylene resin (PTFE resin) is adopted as the material of the sliding member 210.

While the saddle-ride type vehicle is traveling, the spring 21 receives a force in a direction of rotation about the axis CL, so the spring seat portion 40 receiving the spring 21 also receives a force in the direction of rotation. By providing the sliding member 210 on the outer peripheral surface 54 of the first cylindrical portion 50, frictional resistance between the spring seat portion 40 and the inner tube 15 when the spring seat portion 40 rotates can be further reduced. As a result, the rotation of the spring 21 becomes smoother, so operability of the shock absorber 200 can be further improved.

Other operations and effects of the shock absorber 200 of the second example are the same as those of the shock absorber 10 of the first example.

Next, a shock absorber 300 (front fork 300) of a third example will be described with reference to FIG. 15.

Third Example

Figure 15:
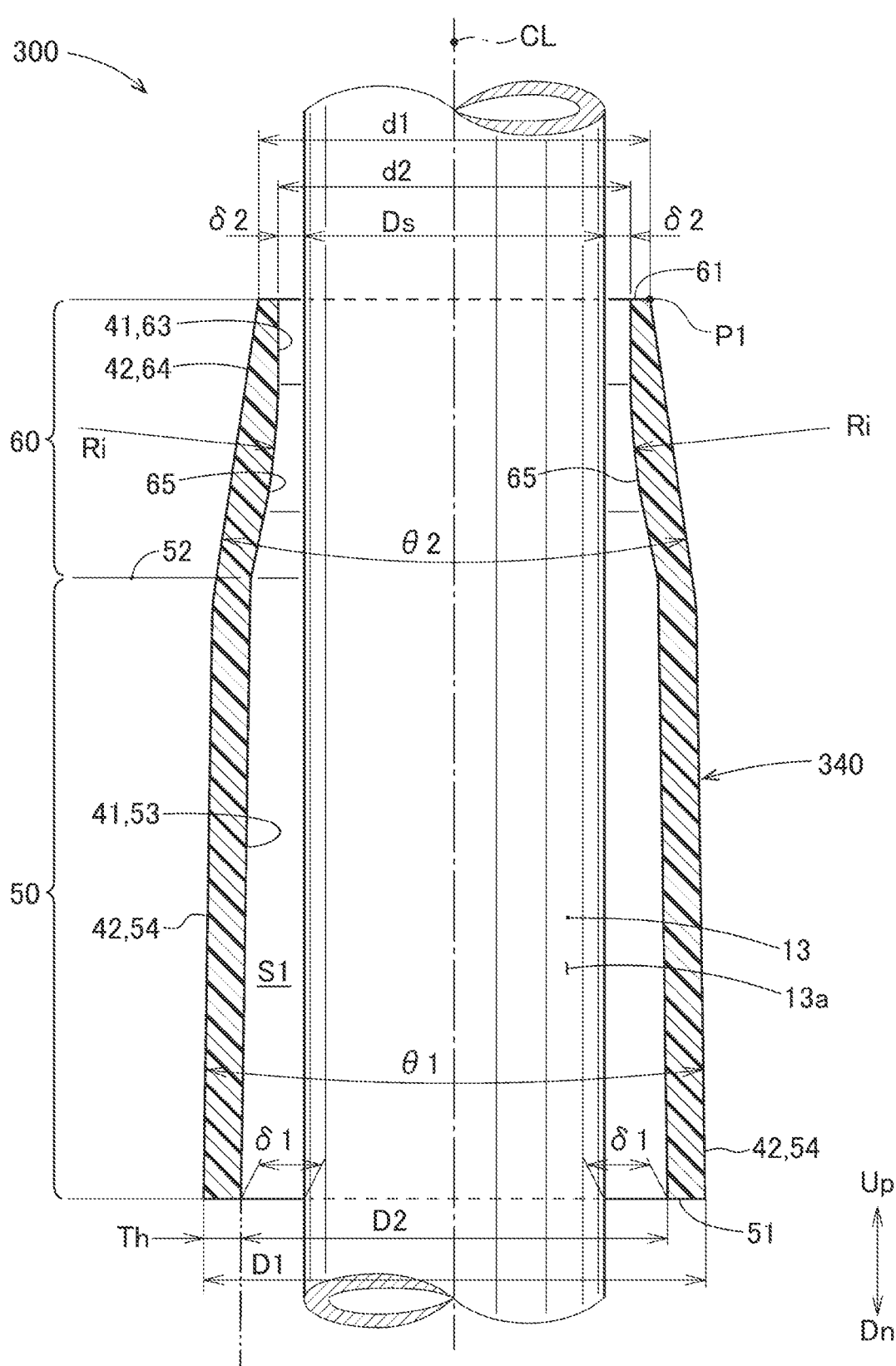
FIG. 15 is an enlarged view of a cylinder and a spring seat portion of a front fork according to a third example.

FIG. 15 is an enlarged view of the cylinder 13 and a spring seat portion 340 of the shock absorber 300, corresponding to FIG. 4 illustrating the shock absorber 10. The shock absorber 300 is characterized by changing the spring seat portion 40 in the shock absorber 10 illustrated in FIG. 4 to the spring seat portion 340 illustrated in FIG. 15, and other basic configurations thereof are the same as those of the shock absorber 10. In the description of the shock absorber 300, the same reference numerals and letters are used for parts common to those of the shock absorber 10, and detailed description of the common parts will be omitted.

The spring seat portion 340 of the third example is characterized in that it does not include the biased portion 70 (groove 80) and the through hole 90 (oil passage hole 90) illustrated in FIG. 4, and other configurations are the same as those of the spring seat portion 40.

The operations and effects of the shock absorber 300 of the third example are the same as those of the shock absorber 10 of the first example 1, except for the operations and effects of the configuration including the biased portion 70 (groove 80) and the through hole 90.

Figure 16:
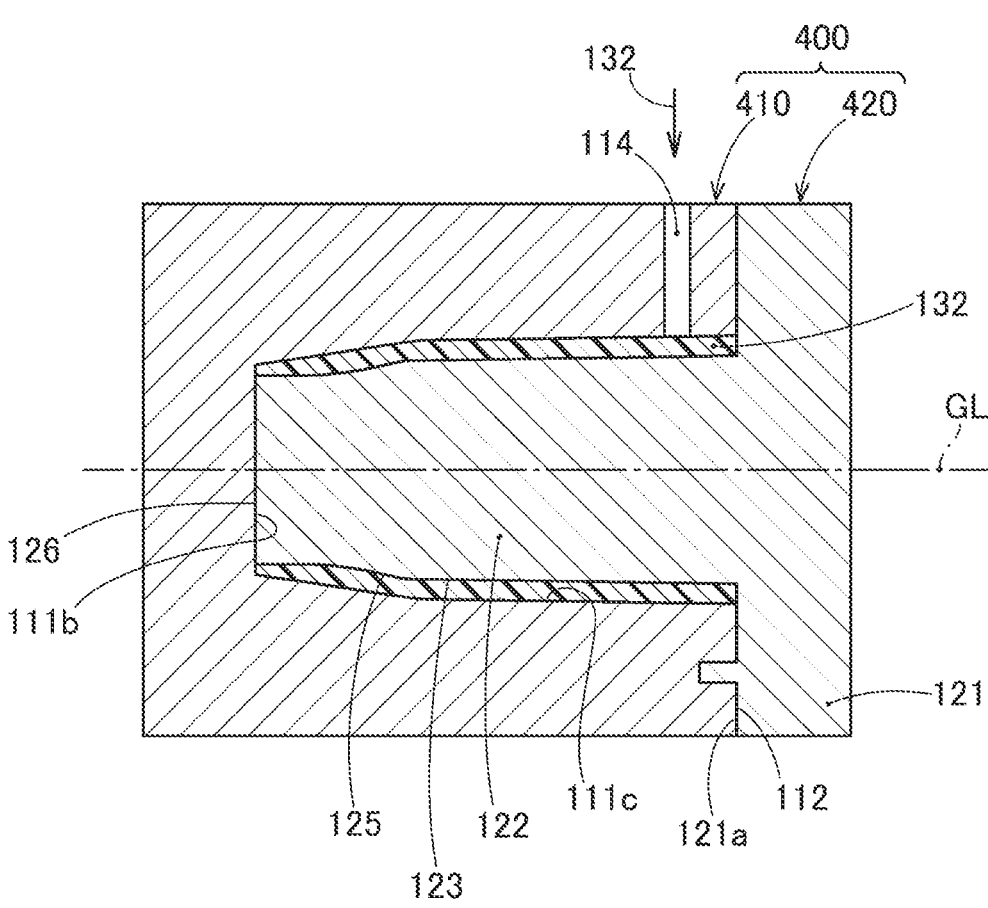
FIG. 16 is a cross-sectional view of clamped molding dies for molding the spring seat portion illustrated in FIG. 15.

The method of manufacturing the shock absorber 300 (front fork 300) of the third example is carried out using a molding die 400 illustrated in FIG. 16. FIG. 16 is a view illustrating the mold-clamped molding die 400, corresponding to FIG. 12 illustrating the mold-clamped molding die 100 of the first example.

The molding die 400 includes a first mold 410 forming a female mold (cavity) and a second mold 420 forming a male mold (core). The first mold 410 has a configuration without the protruding portion 113 in contrast to the first mold 110 of the first example illustrated in FIG. 12. The second mold 420 has the same configuration as the second mold 120 of the first example illustrated in FIG. 11. Other configurations are the same as the molding die 100 of the first example. A method of manufacturing the shock absorber 300 of the third example using the molding die 400 is the same as that of the first example illustrated in FIGS. 7 to 13.

The shock absorbers 10, 200, and 300 according to the present invention are not limited to the examples as long as the operations and effects of the present invention are exhibited.

The shock absorbers 10, 200, and 300 of the present invention are suitable for use in front forks of saddle type vehicles having two or three wheels, especially front forks of off-road type motorcycles.

What is claimed is:

1. A shock absorber, comprising:
   a first cylindrical body formed in a cylindrical shape;
   a second cylindrical body surrounding an outer peripheral surface of the first cylindrical body and provided movably in a direction of an axis of the first cylindrical body with respect to the first cylindrical body;
   a spring provided between the outer peripheral surface of the first cylindrical body and an inner peripheral surface of the second cylindrical body and applying a force in a direction of separating the first cylindrical body and the second cylindrical body;
   a spring seat portion that is a cylindrical body provided between the outer peripheral surface of the first cylindrical body and the inner peripheral surface of the second cylindrical body and supporting an end portion of the spring in the axis direction, the spring seat portion being made of resin and being arranged movably in a direction intersecting the axis direction, wherein the spring seat portion includes a first cylindrical portion having a cylindrical shape and supporting the end portion of the spring, a second cylindrical portion having a cylindrical shape and continuously extending from the first cylindrical portion toward a side opposite to the spring and a through hole formed in the first cylindrical portion in the direction intersecting the axis direction, an outer diameter of the second cylindrical portion is smaller than an outer diameter of the first cylindrical portion, an inner diameter of the second cylindrical portion is smaller than an inner diameter of the first cylindrical portion, and an inner peripheral surface of the second cylindrical portion has a curved surface portion of which an inner diameter increases as it approaches the first cylindrical portion.

2. The shock absorber according to claim 1, wherein the spring seat portion has a biased portion in which a part of an outer peripheral surface of the spring seat portion is partially biased toward an inner peripheral surface side.

3. The shock absorber according to claim 2, wherein the through hole is bored in the biased portion.

4. The shock absorber according to claim 1, wherein an annular sliding member is provided on the outer peripheral surface of the spring seat portion and is slidable on the inner peripheral surface of the second cylindrical body, and the sliding member is made of a material with a smaller coefficient of friction than the spring seat portion.

5. The shock absorber according to claim 2, wherein an annular sliding member is provided on the outer peripheral surface of the spring seat portion and is slidable on the inner peripheral surface of the second cylindrical body, and the sliding member is made of a material with a smaller coefficient of friction than the spring seat portion.

6. The shock absorber according to claim 3, wherein an annular sliding member is provided on the outer peripheral surface of the spring seat portion and is slidable on the inner peripheral surface of the second cylindrical body, and the sliding member is made of a material with a smaller coefficient of friction than the spring seat portion.

7. A shock absorber, comprising:

a first cylindrical body formed in a cylindrical shape;

a second cylindrical body surrounding an outer peripheral surface of the first cylindrical body and provided movably in a direction of an axis of the first cylindrical body with respect to the first cylindrical body;

a spring provided between the outer peripheral surface of the first cylindrical body and an inner peripheral surface of the second cylindrical body and applying a force in a direction of separating the first cylindrical body and the second cylindrical body; and a spring seat portion that is a cylindrical body provided between the outer peripheral surface of the first cylindrical body and the inner peripheral surface of the second cylindrical body and supporting an end portion of the spring in the axis direction, the spring seat portion being made of resin and being arranged movably in a direction intersecting the axis direction, wherein the spring seat portion includes a first cylindrical portion having a cylindrical shape and supporting the end portion of the spring, a second cylindrical portion having a cylindrical shape and continuously extending from the first cylindrical portion toward a side opposite to the spring, a groove located on an outer peripheral surface of the spring seat portion and extending from a tip end surface of the second cylindrical portion toward a tip end surface of the first cylindrical portion, and a through hole positioned at a bottom of the groove and formed in the first cylindrical portion in a direction intersecting an axis of the spring seat portion, an outer diameter of the second cylindrical portion is smaller than an outer diameter of the first cylindrical portion, an inner diameter of the second cylindrical portion is smaller than an inner diameter of the first cylindrical portion, and an inner peripheral surface of the second cylindrical portion has a curved surface portion of which an inner diameter increases as it approaches the first cylindrical portion.

8. A method of manufacturing the spring seat portion for the shock absorber according to claim 1, wherein the spring seat portion is manufactured through the steps of:

preparing a first mold and a second mold, the first mold constituting a female mold configured to form an outer peripheral surface of the spring seat portion, the first mold including a protruding portion protruding radially inward from an inner peripheral surface of the female mold and extending from a bottom of the female mold toward an open end, the second mold constituting a male mold movably fitted in the first mold in a direction along an axis of the spring seat portion and configured to form an inner peripheral surface of the spring seat portion, and the second mold including an outer peripheral surface that is movable in a moving direction of the male mold while being in contact with a radially inner surface of the protruding portion;

clamping the second mold against the first mold after preparing the first mold and the second mold;

filling resin in a liquid state into a part interposed between the first mold and the second mold after clamping the second mold against the first mold;

opening the second mold with respect to the first mold after the filled resin is hardened into a resin-molded spring seat portion; and removing the resin-molded spring seat portion from the part after opening the second mold with respect to the first mold, wherein the second mold expands its diameter, as it goes rearward from a tip end part that is fitted into the first mold, in a curved line shape over an entire circumference of an outer peripheral surface.

9. A method of manufacturing the spring seat portion for the shock absorber according to claim 7, wherein the spring seat portion is manufactured through the steps of:

preparing a first mold and a second mold, the first mold constituting a female mold configured to form an outer peripheral surface of the spring seat portion, the first mold including a protruding portion protruding radially inward from an inner peripheral surface of the female mold and extending from a bottom of the female mold toward an open end, the second mold constituting a male mold movably fitted in the first mold in a direction along an axis of the spring seat portion and configured to form an inner peripheral surface of the spring seat portion, and the second mold including an outer peripheral surface that is movable in a moving direction of the male mold while being in contact with a radially inner surface of the protruding portion; clamping the second mold against the first mold after preparing the first mold and the second mold;

filling resin in a liquid state into a part interposed between the first mold and the second mold after clamping the second mold against the first mold; opening the second mold with respect to the first mold after the filled resin is hardened into a resin-molded spring seat portion; and removing the resin-molded spring seat portion from the part after opening the second mold with respect to the first mold, wherein the second mold expands its diameter, as it goes rearward from a tip end part that is fitted into the first mold, in a curved line shape over an entire circumference of an outer peripheral surface.

\* \* \* \* \*